United States Patent [19]
Chen et al.

[11] Patent Number: 5,430,669
[45] Date of Patent: Jul. 4, 1995

[54] APPARATUS FOR FINDING THE SQUARE ROOT OF A NUMBER

[75] Inventors: Sau-Gee Chen, Hsinchu; Chieh-Chih Li, Chia-I, both of Taiwan

[73] Assignee: United Microelectronics Corp., Hsinchu City, Taiwan

[21] Appl. No.: 162,498

[22] Filed: Dec. 3, 1993

[51] Int. Cl.$^6$ .............................................. G06F 7/38
[52] U.S. Cl. ................................................ 364/752
[58] Field of Search ................. 364/752, 748, 735, 736

[56] References Cited

U.S. PATENT DOCUMENTS

| | | | |
|---|---|---|---|
| 4,336,599 | 6/1982 | Wong | 364/752 |
| 4,939,686 | 7/1990 | Fandrianto | 364/752 |
| 5,331,586 | 7/1994 | Kitora | 364/752 |

*Primary Examiner*—Roy N. Envall, Jr.
*Assistant Examiner*—Emmanuel L. Moise
*Attorney, Agent, or Firm*—Ladas & Parry

[57] ABSTRACT

A fast square root method which separates the sign detection operation of the remainder from the remainder subtraction operation. By taking the absolute values of the remainders, the method can successively subtract the remainder without knowing the signs of remainders, while signs of the remainder can be detected in parallel fashion and independently. The method also uses a smaller square root digit set of $\{-1, 1\}$ than $\{-1, 0, 1\}$ that is used by many known fast algorithms. This digit set facilitates fast conversion of the results to binary representations. Together with some hardware design techniques, the square root method can be realized and pipelined in simple circuits.

2 Claims, 3 Drawing Sheets

APPARATUS FOR FINDING THE SQUARE ROOT OF A NUMBER

BACKGROUND OF THE INVENTION

The present invention relates to an apparatus for finding the square root of a number, and especially to an apparatus for finding a square root in a digital system.

Inherently, square root operation is a sequential operation. The a square root digits are produced only after the sign of the remainders have been detected. As a result, square root operation is much slower than multiplication operation. Efforts have been made to up the square root operation. It is noted that the Analogous algorithm eliminates the restoring operations of the partial remainders. Another algorithm confines the square root digits either to be 1 or −1, depending on the signs of remainders. However, the bottleneck of those algorithms lies in sign detection of the remainder. Fast addition algorithms such as CLA (carry-lookahead addition) shorten the operation time, but result in complex hardware structures.

Recently, a square root algorithm based on SD (signed-digit) number representation was proposed which is much faster than the previous algorithms. This algorithm considerably shortens the time for remainder subtraction by using carry-propagation-free SD addition. However, it is much more complex because in each iteration the SD algorithm must check three most significant digit (MSD) bits of the remainder to decide the quotient digit in the set of {−1, 0, 1}, and then perform the SD addition. Moreover, the final SD result must be converted to binary representation. Also note that the signed-digit addition is more complicated than the conventional CSA, and it needs a complex square root decision circuit.

Another type of algorithm entirely avoids the slow subtract-detect-shift type of operation previously mentioned. It transforms the square root operation to a series of multiplication operations that converge to the original square root. Thus type of algorithm is often found in multiplier-based processors. It still uses a sequential type of operation to a certain degree, and obviously requires many more shift-and-add operations.

There is an on-line square root algorithm that facilitates serial/serial square root operation. This algorithm has advantages such as that: (a) it is pipelined at digit level; (b) all operands and results are input and output in a digit-serial fashion, and (c) result digits are on-line obtained after a few initial delays. On the other hand, among some of its disadvantages are: (a) it requires more complex three-input signed-digit addition operation; (b) it needs more complicated square root decision circuitry for range detection of the remainder; and (c) output results have to be converted to binary representations.

SUMMARY OF THE INVENTION

In this work, a fast radix-2 square root algorithm and its architecture is proposed. The algorithm adheres to the subtract-and-add type of square root operation because it uses fewer iteration steps than those utilizing multiplicative approaches. The key idea behind this algorithm is to separate the sign detection operation of the remainder from the remainder subtraction operation. By taking the absolute values of the remainders, the remainders can be successively subtracted without the need of knowing the signs of remainders, while signs of the remainders can be decided in parallel fashion and independently at the same time. To enhance the algorithms performance, several design techniques were incorporated into its architecture realization.

The new algorithm and its architecture retains as many advantages of the aforementioned algorithms as possible, and simultaneously gets rid of their disadvantages. The algorithm adopts non-restoring square root operation and CSA type of operation for fast subtraction. Square root digit set of {1, −1} is assumed for fast square root conversion to binary representation. The algorithm is also an on-line algorithm that facilitates highly pipelined operation while it is much simpler than the existing on-line algorithms.

The objects of the present invention are fulfilled by providing a digital device for finding a square root from a original number and a subtracter. This device comprises: a plurality of full-adders, each coupled in sequence, each of the full-adders receiving one digit of the original number and one digit of the subtracter and performing signed-digit subtraction, then outputting the result of the partial remainder of the subtraction, a plurality of negating circuits (hereinafter referred to as a negating circuit) for taking the absolute value of the partial remainder, each coupled in the same sequence with the full-adders and coupled with the corresponding full-adder, each of the negating circuits receiving one digit of the result of the partial remainder of the subtraction from the corresponding full-adder and a flag from the preceding negating circuit, if any, and inverting the sign of the digit received from the corresponding full-adder when the flag received from the preceding negating circuit is negative and when the flag received from the preceding negating circuit is zero and the digit received from the corresponding full-adder is negative, and keeping the sign of the digit received from the corresponding full-adder when the flag received from the preceding negating circuit is positive or zero and the digit received from the corresponding full-adder is positive or zero, then outputting the digit to the preceding full-adder of the corresponding full-adder for the next iteration, and outputting a positive flag when the flag received from the preceding negating circuit is positive or when the flag received from the preceding negating circuit is zero and the digit received from the corresponding full-adder is positive, or outputting a negative flag when the flag received from the preceding negating circuit is negative or when the flag received from the preceding negating circuit is zero and the digit received from the corresponding full-adder is negative, and outputting a zero flag when the flag received from the preceding negating circuit is zero and the digit received from the corresponding full-adder is zero, and stopping the iteration when all digits of the partial remainder are zero: and a plurality of square root decision circuits, each coupled in sequence, each of the square root decision circuits being coupled with the corresponding negating circuit and full-adder, for outputting "1" to the preceding full-adder and "0" to the next full-adder when the partial remainder and the last partial remainder are both positive, or the partial remainder and the last partial remainder are both negative, or outputting "0" to the preceding full-adder and "1" to the next full-adder when the partial remainder is positive and the last partial remainder is negative, or the partial remainder is negative and the last partial remainder is positive, or outputting "1" to the preceding full-adder when all digits of the partial remainder are zero.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE FIGURES

The present invention will become more fully understood from the detailed description given hereinafter and the accompanying drawings which are given by way of illustration only, and thus are not limitative of the present invention and wherein:

FIG. 2b is a schematic circuit diagram showing an embodiment of a half-adder HA1 shown in FIG. 2a;

FIG. 2c is a schematic circuit diagram showing an embodiment of a half-adder HA2 shown in FIG. 2a;

FIG. 3b is a schematic circuit diagram showing an embodiment of the negating circuit shown in FIG. 3a.

DETAILED DESCRIPTION OF THE EMBODIMENTS

Figure 1:
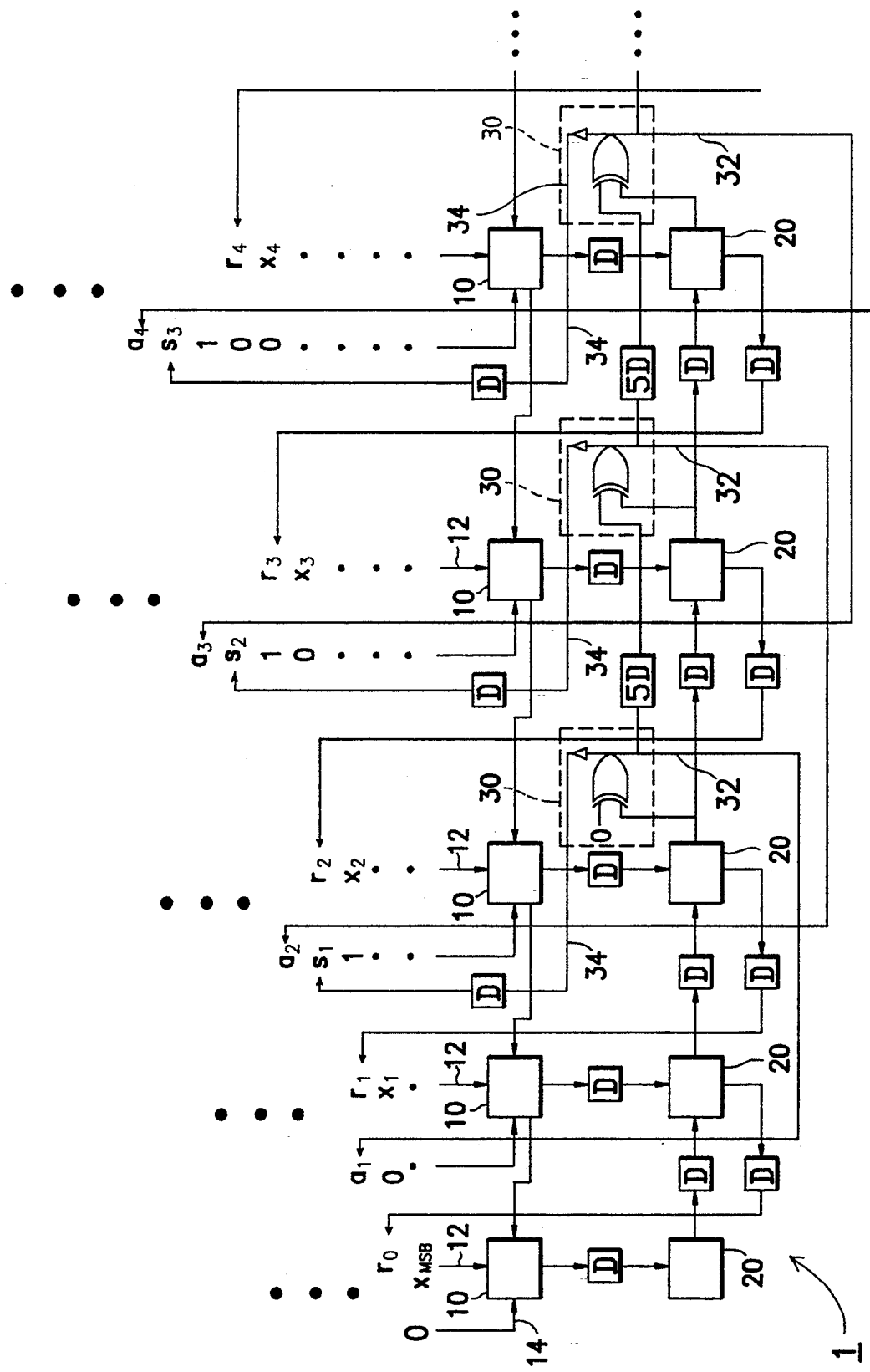
FIG. 1 is a schematic block diagram showing a square root finder according to the present invention.

For achieving fast square root, a new square root algorithm is discussed hereinafter.

NEW SQUARE ROOT ALGORITHM

The conventional nonrestoring square-root operation algorithm is:

$$X_i = X_{i-1} - (2Y_{i-1} + y_i 2^{-i}) y_i 2^{-i} = X_0 - Y_i^2 \quad (1)$$

or $$X^*_i = 2X^*_{i-1} - (2Y_{i-1} + y_i 2^{-i}) y_i = (X_0 - Y_i^2) 2^i \quad (2)$$

wherein $$Y_i = Y_{i-1} + y_i 2^{-1}, \text{ and } X^*_i = X_i 2^{+i} \quad (3)$$

i is recursive control,
$X_i$ is the i-th partial remainder,
$X^*_i$ is the i-th shift partial remainder,
X or $X_0$ or $X^*_0$ are the input operand,
$Y_i$ is the i-th partial square root, and $Y_0 = 0$,
Y or Yn is the square root,
$y_i$ is the i-th digit of Y, and $y_i \in \{-1, 1\}$.

The proposed method of taking square root is by taking the absolute value of Eq. (1) or (2), which yields $$X_i = |X_{i-1} - (2Y_{i-1} + y_i 2^{-i}) y_i 2^{-i}| = |X_0 - Y_i^2| \quad (4)$$

or $$X^*_i = |2X^*_{i-1} - (2Y_{i-1} + y_i 2^{-i}) y_i'| = |(X_0 - Y_i^2) 2^i| \quad (5)$$

wherein $y_i'$ is the i-th digit of the pseudo square root.

It can be observed from Eq. (5) that shift partial remainders are all positive. Since $X^*_{i-1}$ is positive and $y_i' = 1$, and that $2X^*_{i-1}$ is subtracted by $(2Y_{i-1} + y_i 2^{-i}) y_i'$, we can simplify Eqs. (4) and (5) as $$X_i = |X_{i-1} - (2Y_{i-1} + y_i 2^{-i}) 2^{-1}| = |X_0 - Y_i^2| \quad (6)$$

or $$X^*_i = |2X^*_{i-1} - (2Y_{i-1} + y_i 2^{-i})| = |(X_0 - Y_i^2) 2^i| \quad (7)$$

wherein
$Y_i = Y_{i-1} + Y_i 2^{2-i}$, $X_i^* = X_i 2^{-i}$.

$$y_i = \begin{cases} 1, & \text{if } S_i = 0 \text{ (remainder} > 0) \\ 1, & \text{if } Z_i = 1 \text{ (remainder} = 0) \\ -1, & \text{if } S_i = 1 \text{ (remainder} < 0) \end{cases}$$

where
$S_{ri}$ = The sign of remainder before taking absolute value,
$S_i$ = True sign of remainder = $S_{i-1} \oplus S_{ri}$,
$Z_i$ = Zero flag,
$S_0 = S_{r0} = Z_0 = 0$, since $X_0 > 0$, so $y_0 = 1$.

Defining the subtracter $K_i = (2Y_{i-1} + y_i 2^{-i})$, $K_i$ can be expressed in binary form as $$K_i = \begin{cases} 0 \cdot a_1 a_2 \ldots a_{i-1} 01, & \text{if } y_{i-1} = 1 \\ 0 \cdot a_1 a_2 \ldots a_{i-1} 11, & \text{if } y_{i-1} = -1 \end{cases} \quad (8)$$

$$K_0 = 0.01$$

wherein $a_i$ is the i-th digit of the square root, and $$a_{i-1} = \begin{cases} 1, & \text{if } y_{i-1} = 1 \\ 0, & \text{if } y_{i-1} = -1 \end{cases}$$

which converts the sign-binary representation to binary representation.

Eq. (7) and Eq. (8) give $$X_i^* = \begin{cases} |2X_{i-1}^* - 0 \cdot a_1 a_2 \ldots a_{i-1} 01|, & \text{if } y_i = 1 \\ |2X_{i-1}^* - 0 \cdot a_1 a_2 \ldots a_{i-1} 11|, & \text{if } y_{i-1} = -1 \end{cases} \quad (9)$$

The output square-root result in binary represention is $0 \cdot a_1 a_2 \ldots a_n$.

Subtracter $K_i$ varies with the iteration steps as shown in table 1.

TABLE 1

| iteration | subtracter $K_i$ |
|---|---|
| 1 | 01 |
| 2 | $0a_1 S_1 1$ |
| 3 | $00 a_1 a_2 S_2 1$ |
| 4 | $000 a_1 a_2 a_3 S_3 1$ |
| . | ...... |
| . | ........ |
| . | .......... | wherein $S_i = 0$ when $a_i = 1$, $S_i = 1$ when $a_i = 0$.

Because the absolute value of the partial remainder is taken into iteration in stead of the true value of the partial remainder, this algorithm can generate the digits of the partial remainder and the square root at the same time.

For further speeding up the computation, the signed-digit subtraction is modified by defining the CSA-like operation as follows.

When subtracting the subtracter $K_i = k_1 k_2 \ldots k_n$ from $X = x_1 x_2 \ldots x_n$, it is defined $$x_i - k_i = 2c_{i+1} + t_i \tag{10.a}$$

$$t_i + c_i = z_i \tag{10.b}$$

wherein $X_i, z_i \leftarrow \{-1, 0, 1\}$,
$k_i, t_i \leftarrow \{0, 1\}$, and
$c_i \leftarrow \{-1, 0\}$.

Here, a signed-digit $x_i$ subtracts a binary digit $k_i$, then generates carry $c_{i+1}$ and intermediate result $t_i$. The final result $z_i$ is obtained by adding $t_i$ and the carry-in bit $c_i$. Since $Z_i \leftarrow \{-1, 0, 1\}$, there will be no carry generated from $t_i + c_i$. As a result, the modified signed-digit subtraction efficiently eliminates carry propagation. In addition, the complexity of this operation is similar to that of conventional CSA.

STRUCTURE OF THE SQUARE ROOT FINDER

FIG. 1, shows the schematic block diagram of the square root finder 1 according to the present invention. The present invention is applicable to the square root calculation from an original number X and a subtracter $K_i$ both in binary forms.

The square root finder 1 according to the present invention includes a plurality of full-adders (FA) 10, a plurality of negating circuits 20, and a plurality of square root decision circuits 30. A plurality of shift registers D is disposed between each circuit, for adjusting the timing of all circuits.

As shown in FIG. 2, the full-adders 10 are coupled in sequence, each having a first input 12 for inputting one digit $x_i$ of the original number X, from the most significant bit to the least significant bit, and a second input 14 for inputting one digit $k_i$ of the subtracter K, from the most significant bit to the least significant bit. Each full-adder 10 subtracts $k_i$ from $x_i$, then outputs the remainder $z_i$. Note that $x_i$ and $z_i$ are all signed-digit numbers in the set of $\{-1, 0, 1\}$, which can be represented by two bits, such as $\{11, 00, 01\}$, that used in the present embodiment. In the later description, $x_i$ and $z_i$ are denoted by $x_i^1$, $x_i^2$, $z_i^1$, and $z_i^2$ respectively.

Figure 2A:
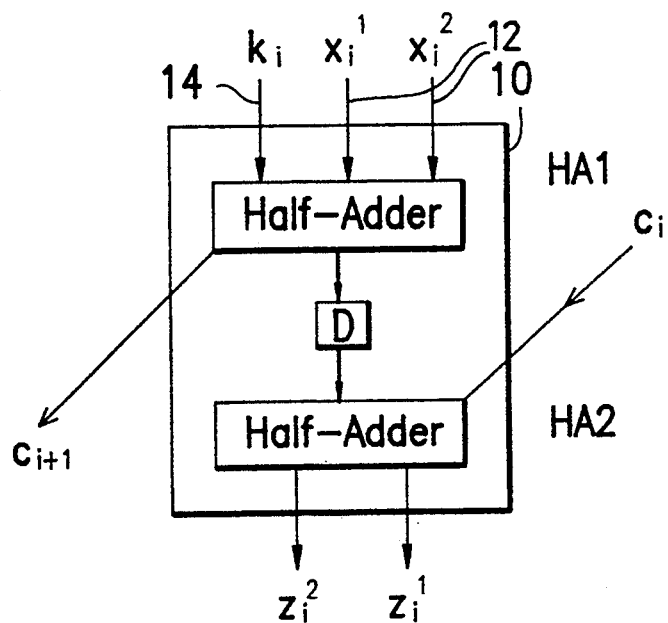
FIG. 2a is a schematic block diagram showing a full-adder.
Figure 2B:
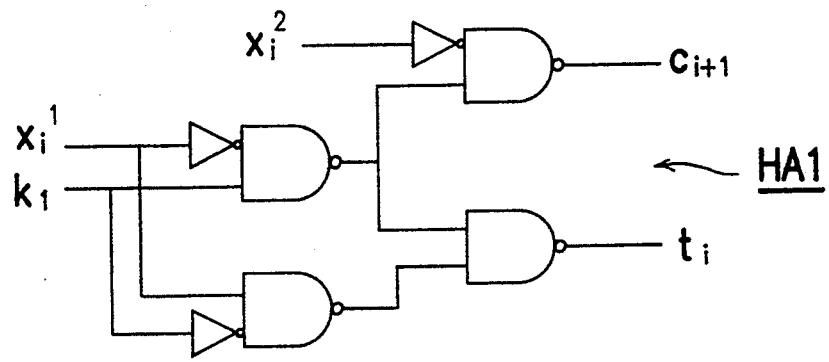
Figure 2C:
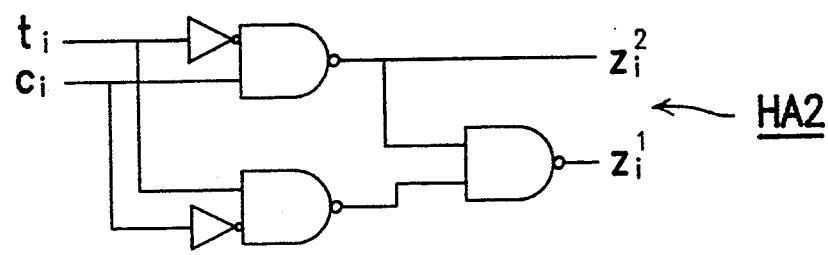

Reference is now made to FIGS. 2a, 2b, and 2c. FIG. 2a shows the circuit block diagram of the full-adder 10. The full-adder 10 comprises two half-adders, HA1 and HA2. A shift register D is interposed between HA1 and HA2 for timing adjustment. Half-adder HA1 receives the original number $x_i$ and the subtracter $k_i$, then performs the subtraction defined in Eq. (10.a), and outputs the carry-in bit $c_{i+1}$ and the intermediate result $t_i$ (FIG. 2b. Half-adder HA2 the intermediate result $t_i$ and the carry-in bit ci, then performs the addition defined in Eq. (10.b), and outputs the final result $z_i$ (FIG. 2c. The preferred embodiment of the circuits of half-adders HA1 and HA2 are as shown in FIG. 2b and FIG. 2c. The truth table of the half-adder HA1 is listed in table 2. The truth table of the half-adder HA2 is listed in table 3 for reference.

TABLE 2

| TRUTH TABLE OF HALF-ADDER HA1 | | | | |
|---|---|---|---|---|
| $K_1$ | $X_1^1$ | $X_1^2$ | $C_{i+1}$ | $t_1$ |
| 0 | 0 | 0 | 0 | 0 |
| 0 | 0 | 1 | 0 | 1 |
| 0 | 1 | 1 | 1 | 1 |
| 1 | 0 | 0 | 1 | 1 |
| 1 | 0 | 1 | 0 | 0 |
| 1 | 1 | 1 | 1 | 0 |

TABLE 3

| TRUTH TABLE OF HALF-ADDER HA2 | | | |
|---|---|---|---|
| $c_i$ | $t_i$ | $z_i^1$ | $z_i^2$ |
| 0 | 0 | 0 | 0 |
| 0 | 1 | 0 | 1 |
| 1 | 0 | 1 | 1 |
| 1 | 1 | 0 | 0 |

The negating circuits 20 are coupled in the same sequence with the full-adders 10, and all coupled with corresponding full-adders 10, for receiving the result of the partial remainders $z_i$. Each of the negating circuit 20 takes the absolute value of the partial remainder, then outputs it to the first input end 12, for next iteration as shown in FIG. 1.

Figure 3A:
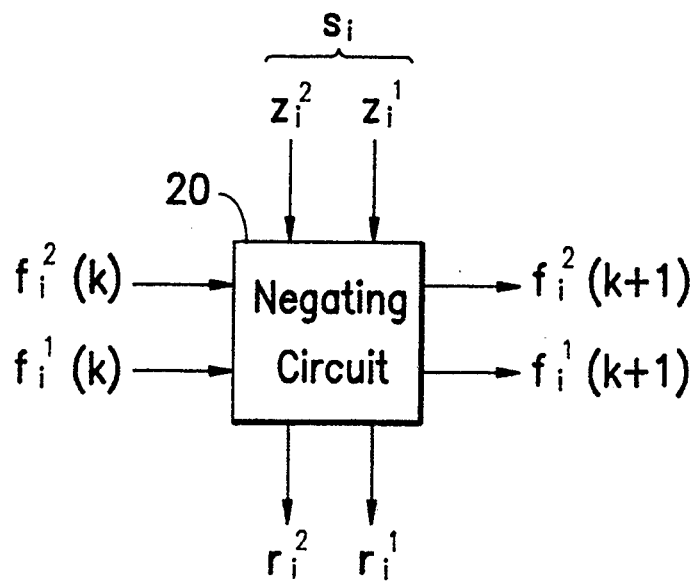
FIG. 3a is a schematic block diagram showing a negating circuit.
Figure 3B:
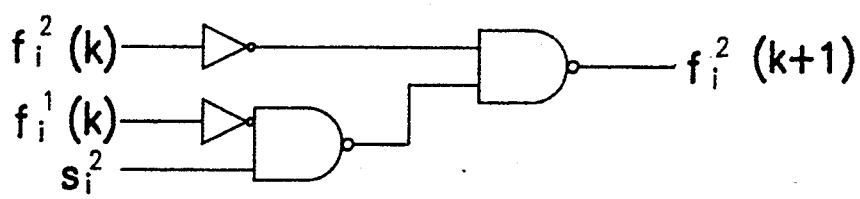
Figure 3B:
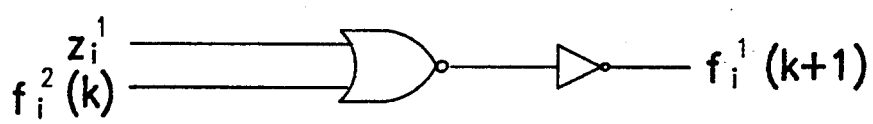
Figure 3B:
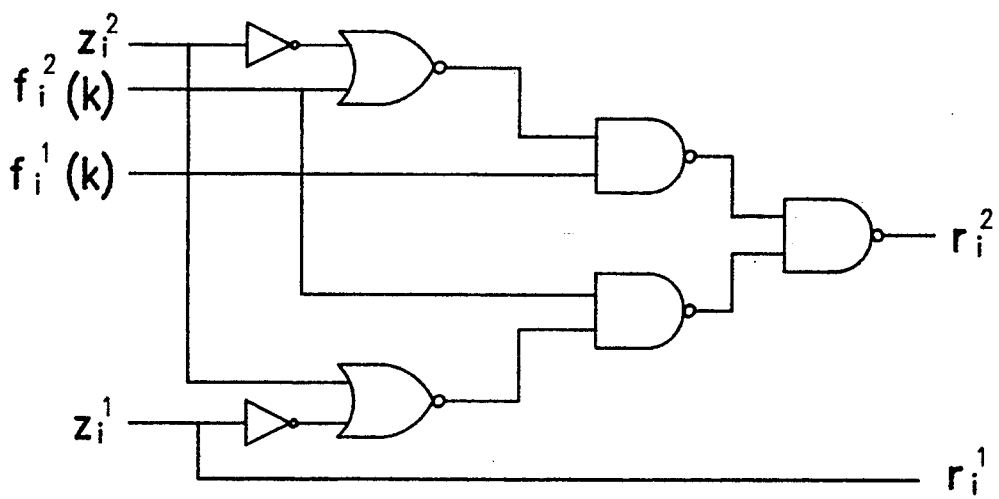

FIG. 3a shows the block diagram of the negating circuit 20. FIG. 3b shows one of the preferred embodiment of the negating circuit 20. The truth table of the negating circuit 20 is listed in table 4.

TABLE 4

| TRUTH TABLE OF NEGATING CIRCUIT 20 | | | |
|---|---|---|---|
| $f_2(k)\ f_i^1(k)$ | $s_i^2 s_i^1$ | $f_i^2(k+1)\ f_i^1(k+1)$ | $r_i^2 r_i^1$ |
| 0 0 | 0 0 | 0 0 | 0 0 |
| 0 0 | 0 1 | 0 1 | 0 1 |
| 0 0 | 1 1 | 1 1 | 0 1 |
| 0 1 | 0 0 | 0 1 | 0 0 |
| 0 1 | 0 1 | 0 1 | 0 1 |
| 0 1 | 1 1 | 0 1 | 1 1 |
| 1 1 | 0 0 | 1 1 | 0 0 |
| 1 1 | 0 1 | 1 1 | 1 1 |
| 1 1 | 1 1 | 1 1 | 0 1 |

The square root decision circuits 30, which may be composed of an exclusive-OR gate and a NOT gate as shown in FIG. 1, are coupled in sequence. The first square root decision circuit 30 in the sequence is coupled to the negating circuit 20 which is coupled to the third full-adder 10. Each square root decision circuit 30 has a first output 32, i. e. the output of the exclusive-OR gate, and a second output 34, i. e. the output of the NOT gate. The first output 32 of the square root decision circuit 30 is coupled to the second input 14 of the preceding full-adder 10. The second output 34 of the square root decision circuit 30 is coupled to the second input 14 of the full-adder 10 which the square root decision circuit 30 is coupled to. At first, digit "1" is inputted to all full-adders 10 as the subtracter K, except the first and second full-adders 10.

When the partial remainder $z_1$ outputted from the first full-adder 10 which receives the most significant bit $x_{MSB}$ is "1" (i.e. "01" in two bits), the first negating circuit 20, which coupled to the first full-adder 10, will output a positive flag $f_1$ (i.e. "01" in two bits). The positive flag will be transmitted to all downstream negating circuits 20 one by one. Since the partial remainder is positive, its absolute value is itself. Each negating circuit 20 will send one digit z of the partial remainder to the first input 12 of the preceding full-adder 10 for next iteration, where the subtracter K is inputted to the second input 14 of the preceding full-adder 10.

When the partial remainder $z_1$ outputted from the first full-adder 10 which receives the most significant bit $x_{MSB}$ is "$-1$" (i.e. "11" in two bits), the first negating circuit 20, which coupled to the first full-adder 10, will output a negative flag $f_1$ (i.e. "11" in two bits). The negative flag will be transmitted to all downstream negating circuits 20 one by one. Since the partial remainder is negative, each digit of the partial remainder will be inverted to get its absolute value. Each negating circuit 20 will invert the sign of one digit $z_i$ of the partial remainder, then output the result $r_i$ (i.e., $-z_i$) to the first input 12 of the preceding full-adder 10 for next iteration, where the subtracter K is inputted to the second input 14 of the preceding full-adder 10.

If the partial remainder $z_1$ outputted from the first full-adder 10 which receives the most significant bit $x_{MSB}$ is "0" (i.e. "00" in two bits), the first negating circuit 20, which coupled to the first full-adder 10, will output a zero flag $f_1$ (i.e. "00" in two bits). In such a condition, the sign of the partial remainder is still not known, the zero flag will be transmitted from the first negating circuit 20 to other nagating circuits 20, until a non-zero flag $f_i$, then the sign of the partial remainder can thus determined, and the absolute value of the partial remainder will be taken. There will be an exact square root if all of the partial remainder digits $z_i$ are zero.

The square root decision circuit 30 determines the square root by the flag $f_i$ and its antecedent $f_{i-1}$. If $f_i$ and $f_{i-1}$ are both positive (i.e. "01"), or $f_i$ and $f_{i-1}$ are both negative (i.e. "11"), then the first output 32 of the square root decision circuit 30 outputs "1" as one digit $a_i$ of the square root, and the second output 34 of the square root decision circuit 30 outputs "0". If $f_i$ is positive and $f_{i-1}$ is negative, or $f_i$ is negative and $f_{i-1}$ is positive, then the first output 32 of the square root decision circuit 30 outputs "0" as one digit ai of the square root, and the second output 34 of the square root decision circuit 30 outputs "1". When all digits $z_i$ of the partial remainder are zero, square root decision circuit 30 will output "1" as one digit $a_i$ of the square root.

The procedure of finding square root will be illustrated by example 1 as follow.

EXAMPLE 1

Let the original number X=01010001$_2$=81

```
        01010001      S₀ = S_{r0} = 0, y₀ = 1
       −01         k₀
       ─────────
        0010001     cᵢ
        0000000     tᵢ
       ─────────
        0010001 > 0  S_{r1} = 0,
                     S₁ = S_{r1} ⊕ S₀ = 0,
SHIFT LEFT ONE BIT
        0010001
       − 101        K₁
       ─────────
        1000001
        1000000
       ─────────
       11000001 < 0  S_{r2} = 1,
                     S₂ = S_{r2} ⊕ S₁ = 1,
TAKE ABSOLUTE VALUE  y₂ = −1, a₃ = 0
       11000001
SHIFT LEFT ONE BIT
       110000010
      − 1011       K₂
       ─────────
       111011010
```

-continued
```
       11011010
      001101110 > 0  S_{r3} = 0,
                     S₃ = S_{r3} ⊕ S₂ = 1,
                     y₃ = −1, a₃ = 0
SHIFT LEFT ONE BIT
        1101110
       −10011
       ─────────
        1001000
        0100100
       ─────────
              0      Z₄ = 1, y₄ = 1, a₄ = 1
```

Result: The square root=1001$_2$=9, and remainder=0

In summary, the algorithm for finding square root proposed by the present invention has the advantages as follows:

a) It uses a smaller square root digit set of $\{1, -1\}$ than $\{-1, 0, 1\}$, that simplifies that square root decision circuits like some known algorithms do, but achieves the exact division and trivial conversion of the results from signed-binary representation to binary representation.

b) It needs no square root estimator.

c) In each iteration, the algorithm computes partial remainders without knowing the signs of previous remainders and decides the signs of remainders independently and in parallel. In addition, these two operations are done in pipelined fashion and in digit level with maximum throughput rate.

d) Its architecture basically consists of the simple signed-digit subtractor cells with the same complexity as CSA.

From above discussion, the proposed algorithm for finding square root is very efficient. The new algorithm's realization is composed of a highly regular cellular array, which is suitable for VLSI implementation and can be easily extended to bit-parallel implementation.

While the invention has been described by way of an example and in terms of several preferred embodiments, it is to be understood that the invention need not be limited to the disclosed embodiment. On the contrary, it is intended to cover various modifications and similar arrangements included within the spirit and scope of the appended claims, the scope of which should be accorded the broadest interpretation so as to encompass all such modifications and similar structures.

What is claimed is:

1. A digital device for finding a square root from an original number and a subtrahend, which comprises:

a plurality of full-adders, each arranged in a sequence, each of the full-adders receiving one digit of the original number and one digit of the subtrahend and performing signed-digit subtraction, then outputting a resulting partial remainder of the subtraction;

a plurality of negating circuits for taking the absolute value of the resulting partial remainder, each arranged in said sequence and coupled with a corresponding full-adder, each of the negating circuits receiving one digit of the resulting partial remainder of the subtraction from its corresponding full-adder and a flag, if any, from an adjacent preceding negating circuit and inverting the sign of the digit received from its corresponding full-adder when the flag received from the adjacent preceding negating circuit is negative and when the flag received from the adjacent preceding negating circuit is zero and the digit received from its corresponding full-adder is negative, and keeping the sign of the digit received from its corresponding full-adder when the flag received from the adjacent preceding negating circuit is positive or zero and the digit received from its corresponding full-adder is positive or zero, then outputting the digit to an adjacent preceding corresponding full-adder for a next iteration, and outputting a positive flag when the flag received from the adjacent preceding negating circuit is positive or when the flag received from the adjacent preceding negating circuit is zero and the digit received from its corresponding full-adder is positive, or outputting a negative flag when the flag received from the adjacent preceding negating circuit is negative or when the flag received from the adjacent preceding negating circuit is zero and the digit received from its corresponding full-adder is negative, and outputting a zero flag when the flag received from the adjacent preceding negating circuit is zero and the digit received from its corresponding full-adder is zero, and stopping the next iteration when all digits of the resulting partial remainder are zero; and a plurality of square root decision circuits, each coupled in sequence, a first of said plurality of square root decision circuits being coupled with a third one of said negating circuits and a corresponding third one of said full adders, each remaining square root decision circuit of said plurality of square root decision circuits being respectively coupled with a next following corresponding negating circuit and a next following corresponding full-adder, for outputting a first square root decision circuit indicator to the preceding adjacent corresponding full-adder and a second square root decision circuit indicator to the next following adjacent corresponding full-adder when the resulting partial remainder and the last resulting partial remainder are both positive, or the resulting partial remainder and the last resulting partial remainder are both negative, or outputting said second square root decision circuit indicator to the preceding adjacent corresponding full-adder and said first square root decision circuit indicator to the next following adjacent corresponding full-adder when the resulting partial remainder is positive and the last resulting partial remainder is negative, or the resulting partial remainder is negative and the last resulting partial remainder is positive, or outputting said first square root decision circuit indicator to the preceding adjacent corresponding full-adder when all digits of the resulting partial remainder are zero.

2. A digital device for finding a square root from an original number and a subtrahend, which comprises:

a plurality of full-adders, each arranged in a sequence, each of the full-adders receiving one digit of the original number and one digit of the subtrahend and performing signed-digit subtraction, then outputting a resulting partial remainder of the signed-digit subtraction;

a plurality of negating circuits for taking an absolute value of the resulting partial remainder, each of said plurality of negating circuits arranged in said sequence and coupled with a corresponding full-adder, each of the negating circuits including:

means for receiving one digit of the result of the resulting partial remainder of the subtraction from its corresponding full-adder;

means for receiving a flag, if any, from an adjacent preceding negating circuit, means for processing the sign of the digit received from its corresponding full-adder in accordance with a predetermined relationship between a value of a flag received from the adjacent preceding negating circuit and a value of the digit received from its corresponding full-adder, means then outputting the digit as processed by the means for processing to an adjacent preceding corresponding full-adder for a next iteration, means for outputting a flag to a next adjacent following negating circuit, said means for outputting a flag including means for determining the value of said flag in response to a predetermined relationship between a value of a flag received from an adjacent preceding negating circuit and a digit received from its corresponding full-adder, and means for stopping a next iteration when all digits of the resulting partial remainder are zero; and a plurality of square root decision circuits, each coupled in sequence, a first of said plurality of square root decision circuits being coupled with a third one of said negating circuits and a corresponding third one of said full adders, each remaining square root decision circuit of said plurality of square root decision circuits being respectively coupled with a next following corresponding negating circuit and a next following corresponding full-adder, each of said square root decision circuits including means for outputting square root decision circuit indicators to the preceding adjacent corresponding full-adder and to the next following adjacent corresponding full-adder in accordance with a predetermined relationship between a value of a resulting partial remainder received from its corresponding negating circuit and a last resulting partial remainder.

* * * * *